United States Patent [19]
Toyama et al.

[11] Patent Number: 5,269,285
[45] Date of Patent: Dec. 14, 1993

[54] WIRE SAW AND SLICING METHOD USING THE SAME

[75] Inventors: Kohei Toyama, Shirakawa; Etsuo Kiuchi, Gunma; Kazuo Hayakawa, Takasaki, all of Japan

[73] Assignee: Shin-Etsu Handotai Company, Ltd., Tokyo, Japan

[21] Appl. No.: 982,553

[22] Filed: Nov. 27, 1992

[30] Foreign Application Priority Data

Nov. 29, 1991 [JP] Japan .................. 3-316693

[51] Int. Cl.$^5$ .................................. B28D 1/08
[52] U.S. Cl. .................................. 125/16.01; 125/21; 125/16.02
[58] Field of Search ............... 125/16.01, 16.02, 21; 83/651.1; 51/266

[56] References Cited

U.S. PATENT DOCUMENTS

| | | | |
|---|---|---|---|
| 3,525,324 | 8/1970 | Bonnefoy | 125/21 |
| 3,831,576 | 8/1974 | Mech | 125/16.01 |
| 4,092,972 | 6/1978 | Schmid | 125/16.01 |
| 4,160,439 | 7/1979 | Piat | 125/21 |
| 4,574,769 | 3/1986 | Ishikawa | 125/16.01 |
| 4,655,191 | 4/1987 | Wells et al. | 125/21 |
| 4,766,875 | 8/1988 | Feigelson | 125/21 |
| 5,099,820 | 3/1992 | Stricot | 125/16.02 |
| 5,201,305 | 4/1993 | Takeuchi | 125/16.01 |

FOREIGN PATENT DOCUMENTS

| | | | |
|---|---|---|---|
| 125768 | 6/1986 | Japan . | |
| 251063 | 10/1987 | Japan . | |
| 665380 | 5/1988 | Switzerland | 83/651.1 |
| 678610 | 11/1988 | Switzerland . | |
| 677895 | 7/1991 | Switzerland | 83/651.1 |

OTHER PUBLICATIONS

Masaru Takatani, "Cutting Method and Wire Saw Machine", Patent Abstracts of Japan, vol. 14, No. 97, Feb. 22, 1990.

*Primary Examiner*—Bruce M. Kisliuk
*Assistant Examiner*—Bryan Reichenbach
*Attorney, Agent, or Firm*—Browdy and Neimark

[57] ABSTRACT

To keep, with a simple structure, roller bearing devices, rotatably supporting the end sections of two rollers, at the same and substantially constant temperature, working fluid is applied not only to the slicing sections, but also to roller bearing devices 14b, 14c, 16b, 16c, 18b and 18c. The flow rate of the working-fluid supply to nozzles 20, 22 for slicing-section is controlled in such a way that the temperature of the working fluid coming down from the slicing sections becomes a first preset temperature; and the flow rate of the working-fluid supply to nozzles 24-29 for bearing-section is controlled in such a way that the temperature of the working fluid coming down from the bearing sections becomes a second preset temperature.

3 Claims, 7 Drawing Sheets

WIRE SAW AND SLICING METHOD USING THE SAME

BACKGROUND OF THE INVENTION

1. Field of the Invention

This invention relates to a wire saw for slicing workpieces, such as semiconductor ingots, into wafers and to a slicing method using the same.

2. Description of the Related Art

A wire saw comprises a row of wires arranged parallel to each other and at a fixed pitch. A workpiece is pressed against these wires running in parallel with one another in the directions thereof, while working fluid containing loose abrasive is supplied between the workpiece and the wires, thereby slicing the workpiece into wafers by a grinding action. In this way, a number of wafers having a fixed thickness can be obtained simultaneously. The working fluid is applied to the cut sections of the saw through nozzles as disclosed in Japanese Patent Laid-Open No. 61-125768.

For example, 6 hours is required to cut a silicon semiconductor ingot with a 5" diameter. It is necessary to keep the conditions constant so as to ensure high wafer-surface flatness precision.

However, due to the frictional heat generated between the wires and the workpiece and the frictional heat generated in the bearing sections of the rolling devices, the temperature of the rolling devices fluctuates during slicing, so that the pitch of the row of wires varies as a result of thermal expansion, resulting in the generation of waviness on the wafer surfaces formed by slicing. In view of recent developments in the miniaturization of elements of semiconductor integrated circuit, any waviness on the wafer surfaces will result in a substantial reduction in the yield of the semiconductor devices produced.

Figure 7:
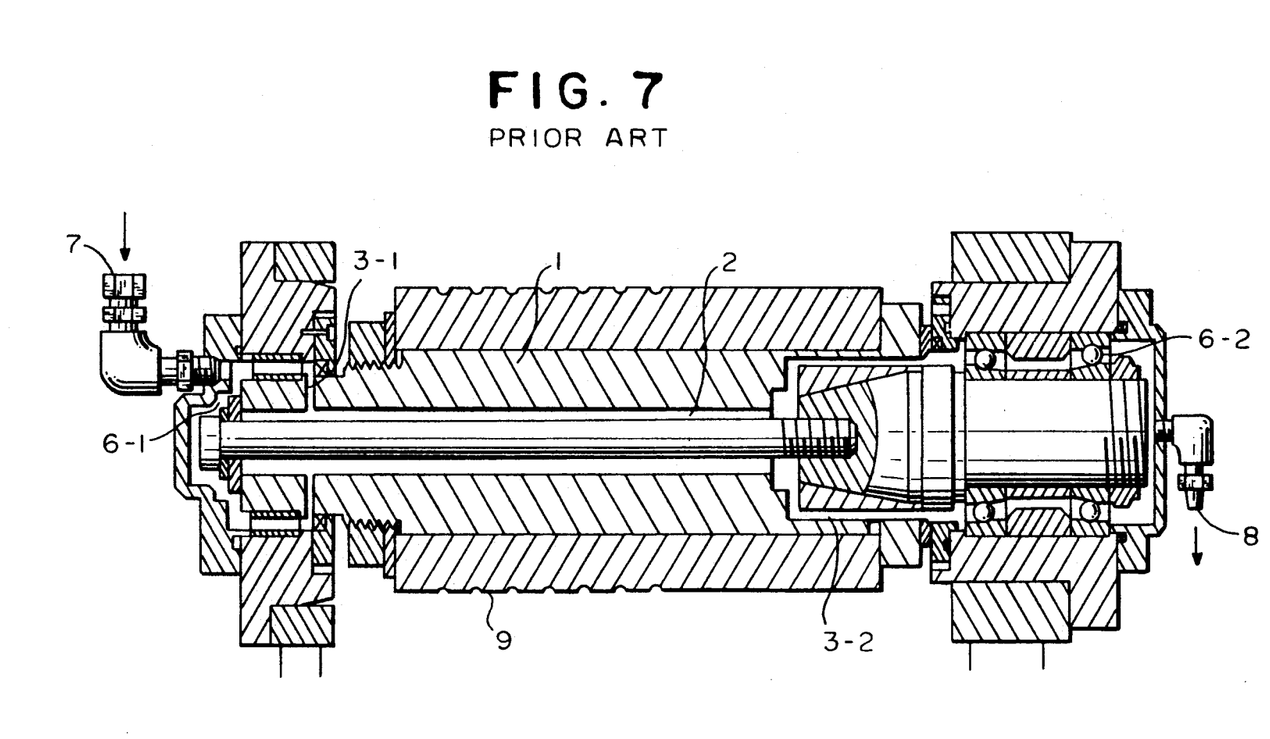
FIG. 7 is a sectional view showing a rolling device of a conventional wire saw.

To mitigate this waviness, the temperature of the working fluid is kept constant. However, with the wire saw disclosed in Japanese Patent Laid-Open No. 61-125768, it is impossible to mitigate the fluctuation in temperature due to the frictional heat generated in the bearings of the rolling devices. In view of this, a rolling-device structure as shown in FIG. 7 has been proposed (Japanese Patent Laid-Open No. 62-251063).

This rolling device includes an axial core 1, a main oil passage 2 formed in the axial core 1, bearings 6-1 and 6-2 rotatably supporting the axial core 1, and lubricating-oil passages 3-1 and 3-2 formed between the bearings 6-1 and 6-2. Oil from an oil tank is supplied to an oil supply port 7 and flows through the bearing 6-1, the lubricating-oil passage 3-1, the main oil passage 2, the lubricating-oil passage 3-2 and the bearing 6-2, to be finally discharged through an oil discharge port 8. The temperature of the ail in the oil tank is maintained at a preset level.

However, when passing through the bearing 6-1, the oil absorbs the frictional heat generated at this bearing, with the result that the temperature of the oil increases. Since the oil whose temperature has been thus increased passes through the bearing 6-2, the heat absorption efficiency at the bearing 6-2 is generally different from that at the bearing 6-1. This difference also depends upon the temperature and the flow rate of the oil supplied to the oil supply port 7. Due to the difference in heat absorption, a temperature gradient is generated from one end of the axial core 1 to the other end, with the result that the coefficient of thermal expansion of the axial core 1 is not uniform along the longitudinal dimension thereof. As a result, the pitch of the wire grooves formed on a sleeve 9 is irregular, which is undesirable. Further, since the steel balls of the bearings 6-1 and 6-2 are closely arranged and are rotating at high speed, the flow-passage resistance at these bearings is relatively large. As a result, oil is apt to become stagnant at the bearing 6-1, so that the amount of heat absorbed by the oil at this bearing increases, thereby further enlarging the difference mentioned above.

Further, when the workpiece is a silicon semiconductor ingot, the length of the axial core 1 is, for example, as long as 1000 mm, resulting in a long flow passage and complicated structure. In addition, lengthening the main oil passage 2 may lead to eccentricity of the rotation center of the axial core 1, deteriorating the surface flatness precision of the wafer.

To ensure a long service life for the slicing wires, the sleeve 9 is made of synthetic resin, which is a heat insulating material, so that the slicing wires cannot be cooled by passing oil through the main oil passage 2.

SUMMARY OF THE INVENTION

In view of the above problems, it is an object of this invention to provide a wire saw and a slicing method using the same in which it is possible, with a simple structure, to maintain the temperatures of two roller bearing devices, supporting both ends of a roller, at an equal and substantially constant level.

A wire saw according to the present invention and a slicing method using the same will be described referring to the components of the embodiments shown in the drawings.

The slicing method of this invention is executed as follows: as shown, for example, in FIGS. 1 through 3, a workpiece 10 is pressed against wires W wound on rollers 14a, 16a and 18a and, in this condition, the wires W are made to run in their longitudinal direction while applying working fluid 32 containing loose abrasive to the slicing sections. The working fluid 32 is also applied to bearing sections 14b, 14c, 16b, 16c, 18b and 18c of the rollers 14a, 16a and 18a.

To execute the above-described method, the wire saw of the present invention includes: as shown, for example, in FIG. 1, nozzles 20, 22 and 24 through 29 whose working-fluid outlet ports are arranged near the slicing sections and in correspondence with the roller bearing devices 14b, 14c, 16b, 16c, 18b and 18c; a vessel 30 arranged below the rollers 14a, 16a and 18a so as to receive the working fluid 32 flowing out of the nozzles 20 through 29; a tank 34 storing the working fluid 32; and working fluid circulating means 44, 46, 48, 50, 52, 54 and 56 through 60 for supplying the working fluid in the tank 34 to the nozzles 20, 22, and 24 through 29 and for withdrawing the working fluid in the vessel 30 into the tank 34.

A large amount of frictional heat is generated at the roller bearing devices 14b, 14c, 16b, 16c, 18b and 18c. This frictional heat could cause the rollers to undergo thermal expansion and change their slicing positions along the axial dimensions thereof, thereby deteriorating the surface flatness precision of the wafer formed by slicing. However, with the above-described slicing method and device of this invention, the working fluid 32 is applied to the roller bearing devices 14b, 14c, 16b, 16c, 18b and 18c, so that it is possible to maintain the roller bearing devices at the same and substantially constant temperature, thereby improving the wafer surface flatness precision. Further, the structure of the rolling devices need not be so complicated as in the prior art, and the cooling medium applied to the roller bearing devices 14b, 14c, 16b, 16c, 18b and 18c is the same working fluid 32 as applied to the wires W, so that no problem arises if the fluid applied to the wires mixes with the fluid applied to the roller bearing devices, thereby realizing a simplified construction.

In a device according to a first aspect of this invention, the nozzles 20, 22, and 24 through 29 are formed on pipes extending along the axes of the rollers 14a, 16a and 18a, the pipes having working fluid outflow ports at positions corresponding to the wires W and the roller bearing devices 14b, 14c, 16b, 16c, 18b and 18c.

Due to this construction, the formation of the nozzles relative to the slicing sections and to the roller bearing devices is simplified.

Figure 1:
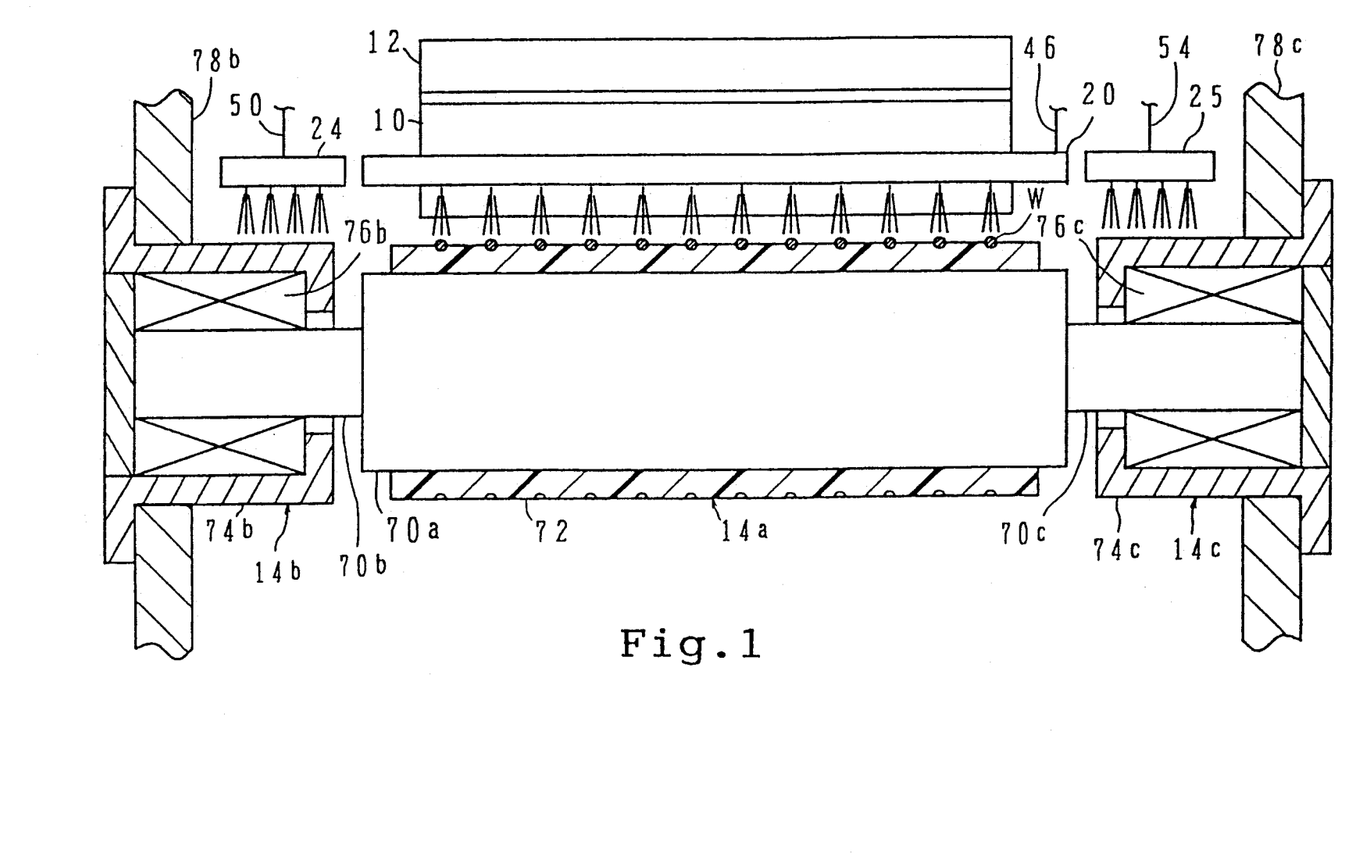
FIG. 1 is a schematic sectional view showing a rolling device of a wire saw and the neighborhood thereof according to a first embodiment of this invention.
Figure 2:
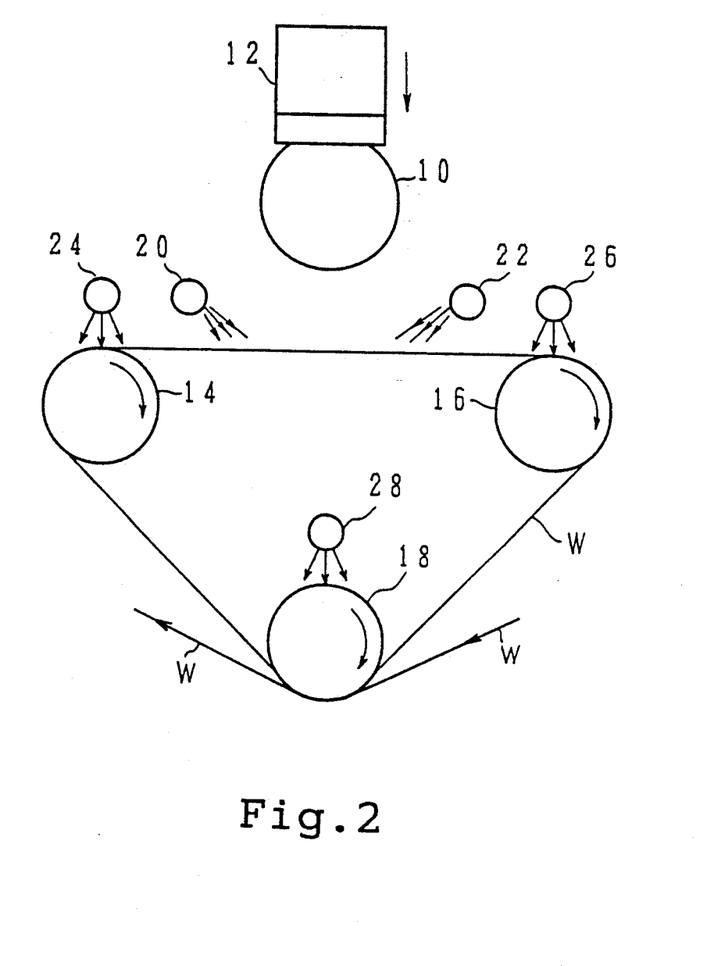
FIG. 2 is a diagram showing how working fluid flows out of the nozzles of the wire saw of the first embodiment.
Figure 3:
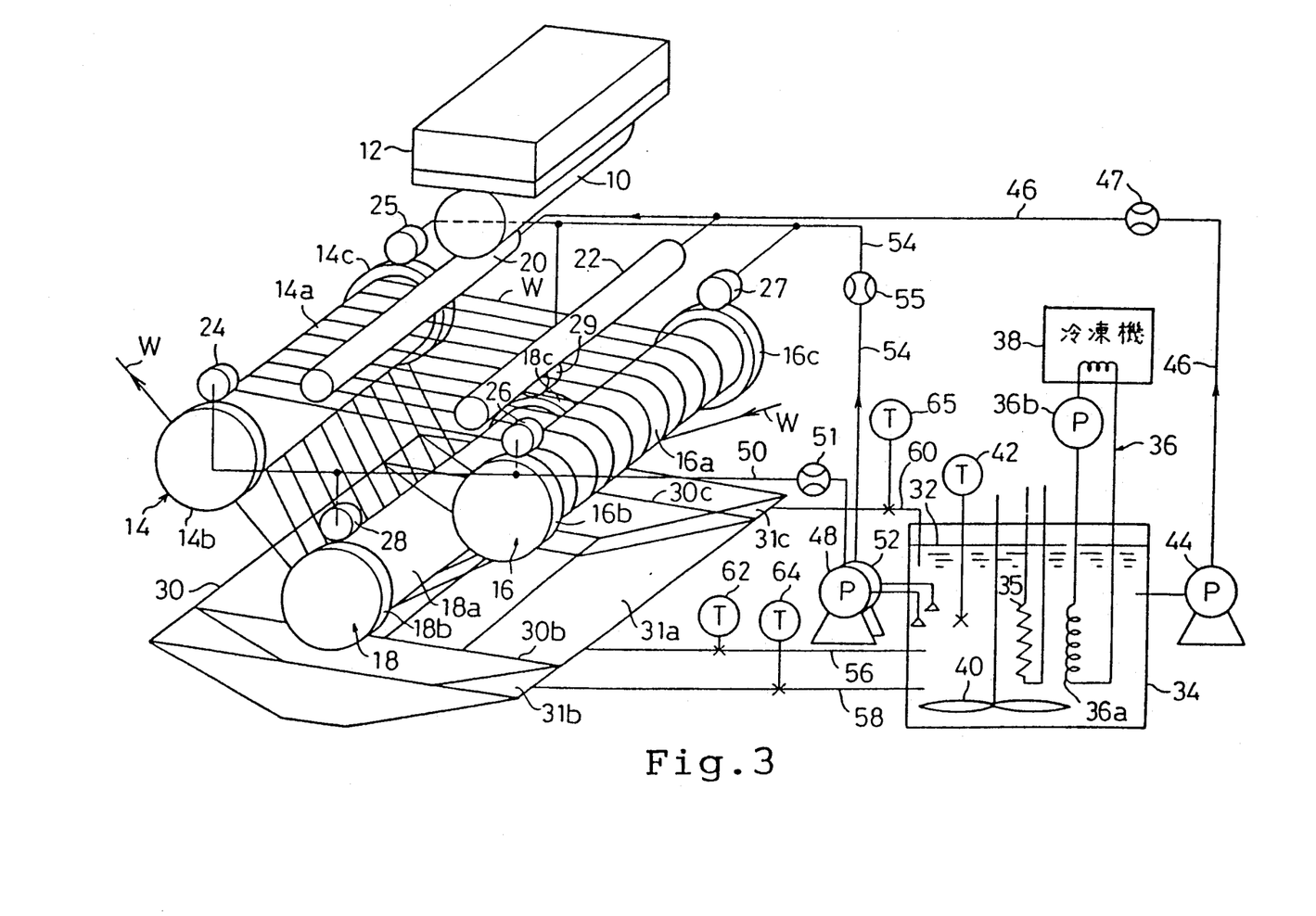
FIG. 3 is a diagram showing the essential components of the wire saw of the first embodiment.

In a device according a second aspect of this invention, the nozzles 20, 22, and 24 through 29 include, as shown, for example, in FIGS. 1 through 3:

nozzles 20, 22 for slicing-section consisting of outflow ports for the working fluid 32 formed on pipes extending along the axes of the rollers 14a, 16a and 18a, at positions corresponding to the wires W;

nozzles 24 through 2-9 for bearing-section consisting of working-fluid outflow ports formed separately from the nozzles for slicing-section, at positions corresponding to the roller bearing devices 14b, 14c, 16b, 16c, 18b and 18c;

the vessel including:

a first receiver section 31a for receiving the working fluid flowing out of the nozzles for slicing-section; and second receiver sections 31b, 31c for receiving the working fluid flowing out of the nozzles for bearing-section;

the working fluid circulating means including:

first flow passages 46, 56 for supplying the working fluid in the tank 34 to the nozzles for slicing-section and for withdrawing the working fluid in the first receiver section into the tank 34;

second flow passages 50, 54, 58, 60 for supplying the working fluid in the tank 34 to the nozzles for bearing-section and for withdrawing the working fluid in the second receiver sections into the tank 34;

a detector 62 for detecting a first temperature T1 of the working fluid flowing form said first receiver section into said tank;

a detector 47 for detecting a first flow rate F1 of the working fluid supplied to the nozzles for slicing-section; of the working fluid flowing from said second receiver sections into said tank section and coming down from the bearing sections;

detectors 51, 55 for detecting a second flow rate F2 of the working fluid supplied to the nozzles for bearing-section;

means 68 for setting first and second preset temperatures;

means 44, 66, 67 for controlling the first flow rate F1 in such a way that the first temperature T1 becomes the first preset temperature; and means 48, 52, 66, 67 for controlling the second flow rate F2 in such a way that the second temperature T2 becomes the second preset temperature.

Due to the above construction, it is possible to maintain the temperatures of the slicing sections and the roller bearing devices independently of each other at a more constant level, thereby reducing the waviness on the wafer surfaces formed by slicing.

In accordance with a third aspect of the present invention, there are further provided:

a detector 42 for detecting a temperature T of the working fluid in the tank 34;

means 66 for calculating heat absorption $Q=(T1-T)F1 +(T2-T)F2$;

heat exchangers 36a, 36b, 38 for cooling the working fluid in the tank 34; and means 66, 67 for controlling the heat absorption by the heat exchangers 36a, 36b, 38 in accordance with the heat absorption Q, in such a way that the temperature T of the working fluid in the tank is a preset temperature.

It becomes possible to make the volume of the tank 34 small by the above construction.

DETAILED DESCRIPTION OF THE PREFERRED EMBODIMENTS

Embodiments of this invention will now be described with reference to the drawings.

First Embodiment

FIG. 3 shows the essential components of the wire saw of the first embodiment.

The workpiece 10 is, for example, a semiconductor ingot, whose orientation-flat surface is glued to a work holder 12, which is raised and lowered by a mechanism that is not shown. Rolling devices 14, 16 and 18 are arranged below the workpiece 10 in such a way as to extend parallel to each other in the axial direction. The rolling device 14 includes a roller 14a whose end sections are rotatably supported by roller bearing devices 14b and 14c. The rolling device 16 includes a roller 16a whose end sections are rotatably supported by roller bearing devices 16b and 16c. The rolling device 18 includes a roller 18a whose end sections are rotatably supported by roller bearing devices 18b and 18c.

As shown in FIG. 1, the roller 14a includes a large-diameter section 70a and small-diameter sections 70b and 70c formed at either end thereof, the large-diameter section 70a being coated with a sleeve 72 of synthetic resin. The roller bearing device 14b includes a holder 74b, which contains a bearing 76b rotatably supporting the small-diameter section 70b, with the holder 74b being secured onto a support plate 78b. Similarly, the roller bearing device 14c includes a holder 74c, which contains a bearing 76c rotatably supporting the small-diameter section 70c, with the holder 74c being secured onto a support plate 78c. A number of ring-like grooves are formed at a regular pitch on the outer peripheral surface of the sleeve 72. Wires W are wound on the sleeve 72, along these grooves. The rolling devices 16 and 18 have the same construction as the rolling device 14.

As shown in FIGS. 1 through 3, nozzles 20 and 22 are arranged on either side of the workpiece 10, along the rolling devices 14 and 16. The nozzles 20 and 22 are formed as pipes having a number of working-fluid outflow ports.

When the work holder 12 is lowered to bring the workpiece 10 into contact with the wires W, the rollers 14a, 16a and 18a are rotated in synchronization, and the wires W are run in the longitudinal direction, with a constant tension. At the same time, working fluid containing loose abrasive is applied to the wires W through the nozzles 20 and 22. When, in this condition, the work holder 12 is lowered, the workpiece 10 is cut at the pitch of the wires W, thereby forming a number of wafers having the same thickness. The frictional heat generated between the workpiece 10 and the wires W during the slicing is absorbed by the working fluid.

The rollers 14a, 16a and 18a are rotated at a relatively high speed, for example, at 1800 rpm, generating a large amount of frictional heat at the roller bearing devices 14b, 14c, 16b, 16c, 18b and 18c. To improve the wafer-surface flatness precision, it is necessary to keep these roller bearing devices at the same and constant temperature during slicing, thereby keeping the rollers 14a and 16a at a constant and uniform temperature along their axial dimensions. To satisfy this requirement, this embodiment employs the following construction:

The nozzles 24 through 29 are arranged above the roller bearing devices 14b, 14c, 16b, 16c, 18b and 18c. Arranged below the rolling devices 14, 16 and 18 is a pan 30 for recovering the working fluid. The pan 30 includes partitions 30b and 30c which divide the space inside the pan 30 into a receiver section 31a and receiver sections 31b and 31c on either end thereof in order that the working-fluid portion coming down from the nozzles 20 and 22, the working-fluid portion coming down from the nozzles 24, 26 and 28, and the working fluid portion coming down from the nozzles 25, 27 and 29, may be separated from each other.

The working fluid 32 is stored in a tank 34. Immersed in the working fluid 32 are a heater 35 and a coil tube 36a of a heat exchanger 36. Cooling medium is circulated through the coil tube 36a by a variable delivery pump 36b, the cooling medium being cooled by a refrigerator 38. The temperature of the working fluid 32 is uniformalized by stirring it by an agitator 40. This temperature is detected by a temperature sensor 42. The working fluid 32 in the tank 34 is drawn up by a variable delivery pump 44, and supplied to the nozzles 20, 22 through an outward pipe 46. The working fluid in the tank is also drawn up by a variable delivery pump 48, and supplied to the nozzles 24, 26 and 28 through an outward pipe 50. Further, the working fluid in the tank is also drawn up by a variable delivery pump 52, and supplied to the nozzles 25, 27 and 29 through an outward pipe 54. The outward pipes 46, 50 and 54 are provided with flow meters 47, 51 and 55, respectively. The working fluid flowing out of the nozzles 20 and 22 is applied to the portions of the wires W near the slicing sections (FIGS. 1 and 2), exerts a lapping action between the workpiece 10 and the wires W, and absorbs the frictional heat generated between the workpiece 10 and the wires W. The working fluid flowing out of the nozzles 24, 26 and 28 is applied to the roller bearing devices 14b, 16b and 18b (FIGS. 1 and 2), and absorbs the frictional heat generated at the bearings. Similarly, the working fluid flowing out of the nozzles 25, 27 and 29 is applied to the roller bearing devices 14c, 16c and 18c, and absorbs the frictional heat generated at the bearings.

The working fluid, having thus absorbed heat, is collected in the pan 30. The working fluid portions in the receiver sections 31a, 31b and 31 are returned to the tank 34 by way of return pipes 56, 58 and 60, respectively. The liquid temperatures in the return pipes 56, 58 and 60 are detected by temperature sensors 62, 64 and 65, respectively.

Figure 4:
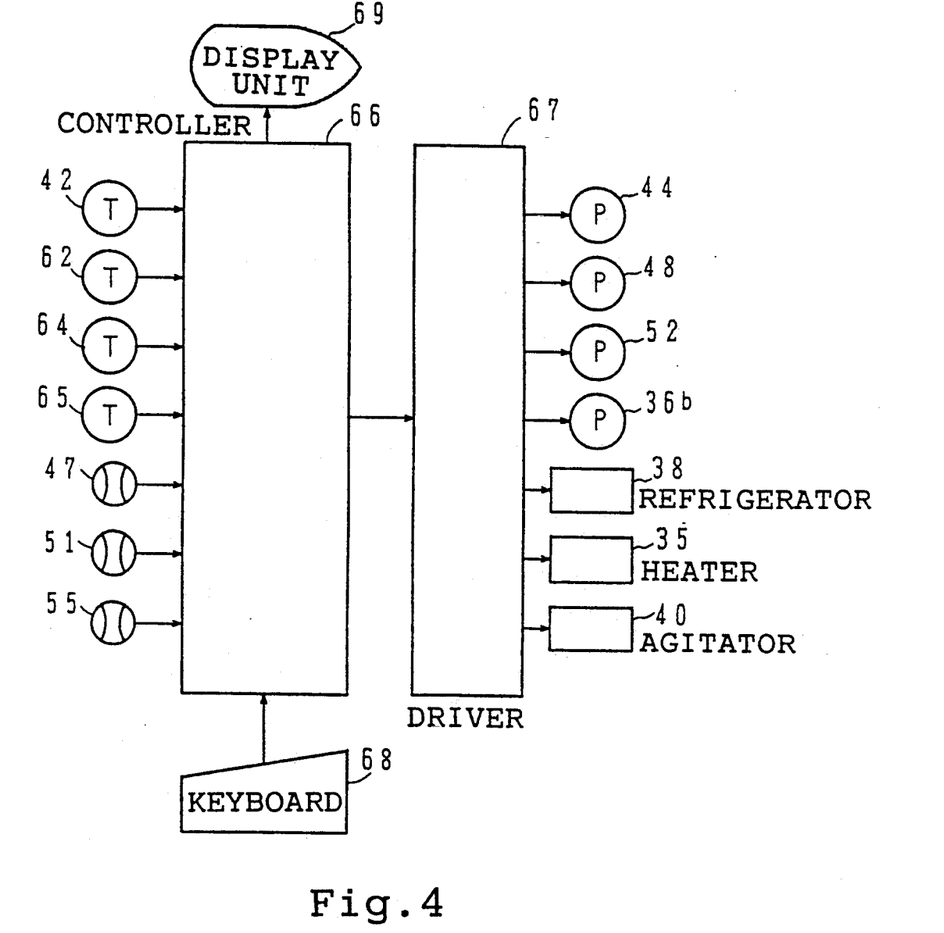
FIG. 4 is control block diagram of the wire saw of the first embodiment.

FIG. 4 is a control block diagram. Detection signals from the temperature sensors 42, 62, 64 and 65 and the flow meters 47, 51 and 55 are supplied to a controller 66, which controls, through a driver 67, the supply flow rates of the variable delivery pumps 36b, 44, 48 and 52 and performs ON/OFF control over the refrigerator 38, the heater 35 and the agitator 40. Various preset values are input to the controller 66 through a keyboard 68, and the controller 66 displays these preset values and various detection values on a display unit 69.

In the above-described construction, the temperature of the working fluid 32 is set in such a way that the roller bearing devices 14b, 14c, 16b, 16c, 18b and 18c attain a preset stationary level as quickly as possible after the slicing starts. In order for the temperature detected by the temperature sensor 42 to attain this preset temperature, TS, electricity is supplied to the heater 35, or cooling water is supplied to the cooling coil tube 38. An example of a preferable preset temperature TS is 28° C., depending upon the wire saw system and the conditions of use.

When slicing has been started, the difference between the temperature TA detected by the temperature sensor 62 and the temperature T detected by the temperature sensor 42 is obtained. The heat absorption Qa of the working fluid passing through the return pipe 56 is obtained from the product of this difference and the flow rate in the outward pipe 46. Similarly, the heat absorption Qb of the working fluid passing through the return pipe 58 and the heat absorption Qc of the working fluid passing through the return pipe 60 are obtained. To compensate for the total heat absorption Qa+Qb+Qc, the flow rate or the temperature of the cooling water supplied to the cooling coil tube 38 is controlled so as to keep the working fluid 32 at the preset temperature. At the same time, the working-fluid-supply flow rates of the variable delivery pumps 44, 48 and 52 are controlled in such a way that the temperature Ta detected by the temperature sensor 62 is a preset temperature T0 and that the temperatures Tb and Tc detected by the temperature sensors 64 and 65 are a preset temperature T1.

Assuming that the preset temperature TS of the working fluid 32 in the tank 34 is 28° C., it has been experimentally found that preset temperatures T0 and T1 reducing the waviness of the wafer surfaces as much as possible are: T0 = 30.0° C., and T1 = 29 ~ 29.5° C.

In accordance with the first embodiment, it is possible to keep the roller bearing devices 14b, 14c, 16b, 16c, 18b and 18c at the same and constant temperature, thereby keeping the temperatures of the rollers 14a, 16a and 18a constant and uniform along their axial dimensions. Further, it is possible to reduce the fluctuation in the pitch of the wires W due to the fluctuation in temperature during slicing, i.e., the waviness of the surfaces of the wafers obtained by slicing the workpiece 10.

Second Embodiment

Figure 5:
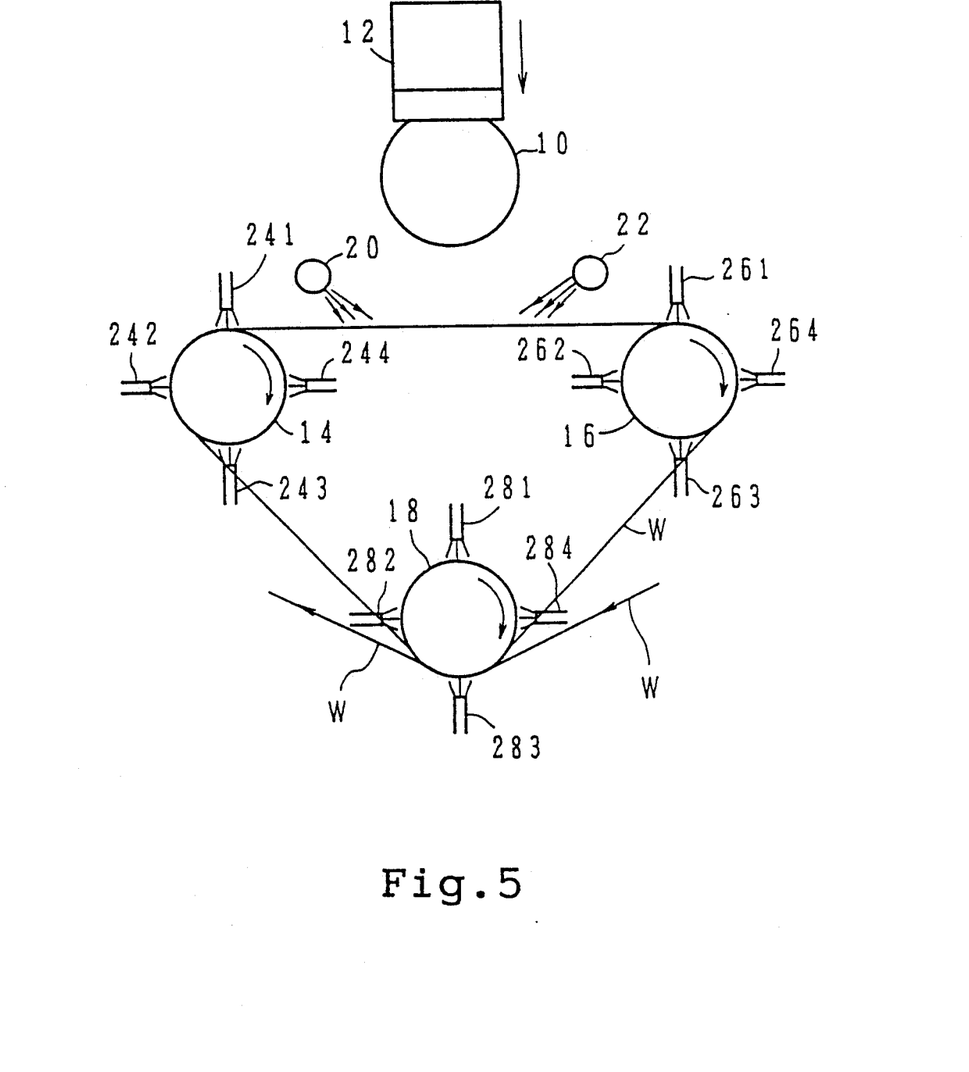
FIG. 5 is a diagram showing how working fluid flows out of the nozzles of a wire saw according to a second embodiment of this invention.

FIG. 5 shows how the working fluid flows out of the nozzles of the wire saw of the second embodiment of this invention.

In the second embodiment, nozzles 241 through 244, separated from each other by 90°, are arranged opposite to one of the roller bearing devices of the rolling device 14; nozzles 261 through 264, separated from each other by 90°, are arranged opposite to one of the roller bearing devices of the rolling device 16; and nozzles 281 through 284, separated from each other by 90°, are arranged opposite to one of the roller bearing devices of the rolling device 18. Similar nozzles are also arranged opposite to the other bearing devices of the rolling devices 14, 16 and 18. Apart from this, the second embodiment is the same as the first embodiment described above.

With the wire saw of the second embodiment, the temperature distribution around the roller bearing devices can obviously be made more uniform than in the first embodiment. Accordingly, the waviness of the surfaces of the wafers obtained by slicing the workpiece 10 can be reduced more than in the first embodiment.

Third Embodiment

Figure 6:
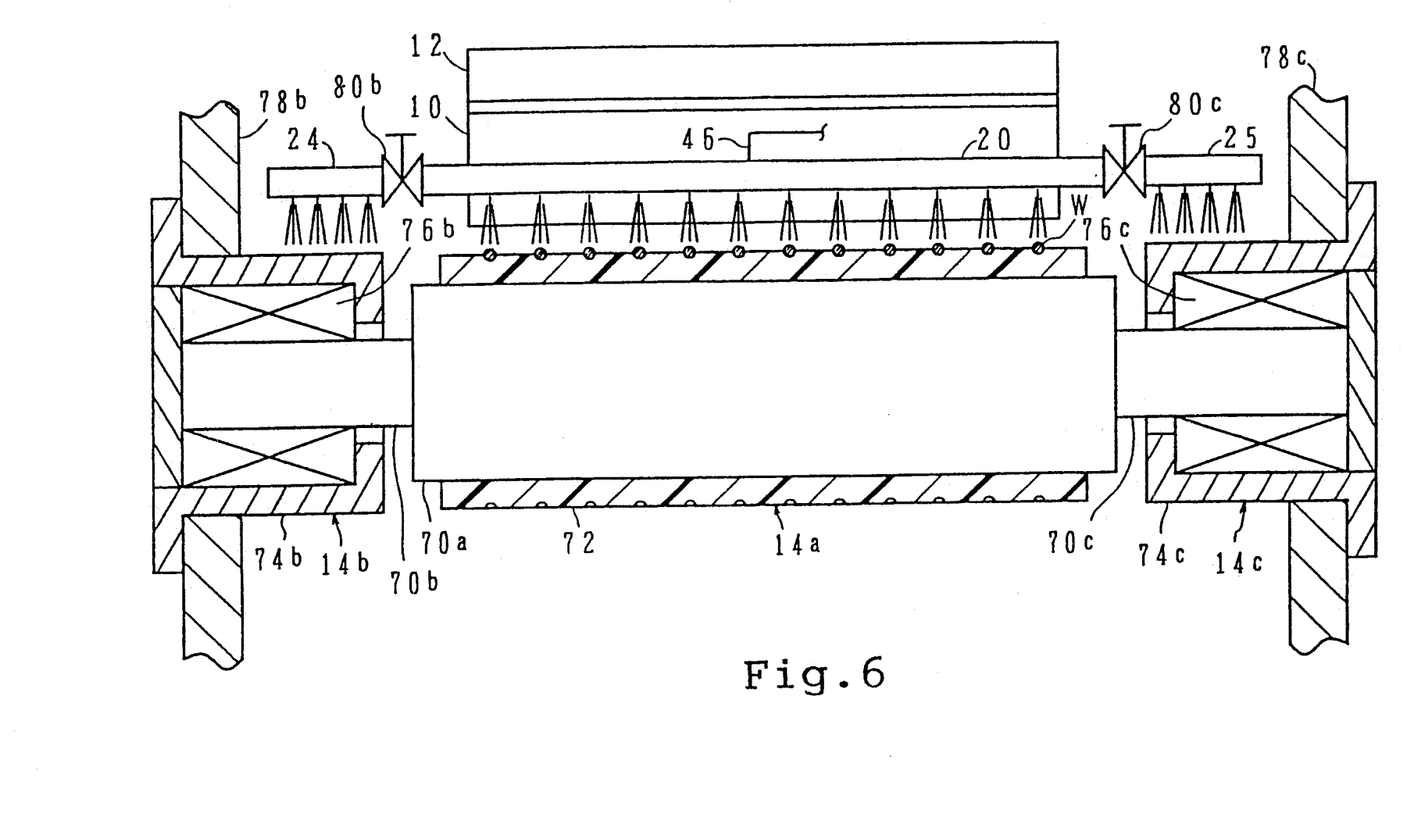
FIG. 6 is a schematic sectional view showing a rolling device of a wire saw according to a third embodiment of this invention and portions around the same.

FIG. 6 is a schematic sectional view showing a rolling device in the wire saw of the third embodiment of this invention and portions around the same.

In the third embodiment, the nozzles 24 are connected to one end of the nozzles 20 through the intermediation of a manual operation valve 80b, and the nozzles 25 are connected to the other end of the nozzles 20 through the intermediation of a manual operation valve 80c. The components 48 through 55, shown in FIG. 3, are omitted. The temperatures detected by the temperature sensors 64 and 65, shown in in FIG. 3, are displayed, and the operator visually observes this display, controlling the openings of the manual operation valves 80b and 80c in such a way that the target temperature is obtained in a stationary state. Apart from this, the third embodiment is the same as the first embodiment.

Although the wire saw of the third embodiment is inferior in operability to that of the first embodiment, it has a simpler construction. It proves advantageous when processing workpieces 10 with the same dimensions. In that case, the operation of the wire saw is not complicated and can be conducted effectively.

What is claimed is:

1. A wire saw of the type in which an array of wires (W) wound on rollers (14a–18a), said wires being arranged in parallel with one another with respect to a workpiece (10) being pressed against the array of wires (W), while applying a working fluid (32) containing loose abrasive to portions of said array of wires adjacent to an area where the workpiece is pressed against the array of wires, said wire saw comprising:
    nozzles (20, 22, and 24–29) having working fluid outflow ports arranged in correspondence with the portions of said array of wires adjacent to the area where the workpiece is pressed against said array of wires and with roller bearing devices (14b, 14c, 16b, 16c, 18b and 18c), supporting said rollers wherein said nozzles (20, 22, and 24–29) include a first set of nozzles (20 and 22) having a first set of working fluid outflow ports and a second set of nozzles (24–29) having a second set of working fluid outflow ports, said first set of nozzles being formed by providing pipes extending parallel to longitudinal axes of said rollers (14a–18a) with said first set of working fluid outflow ports being arranged at positions corresponding to said wires (W) and said second set of working fluid outflow ports being arranged at positions corresponding to said roller bearing devices (14b, 14c, 16b, 16c, 18b and 18c);
    a vessel (30) arranged below said rollers so as to receive a working fluid flow out of said first and second sets of nozzles;
    a tank (34) for storing said working fluid; and
    working fluid circulating means (44, 46, 48, 50, 52, 54, 56–60) for supplying said working fluid in said tank to said first and second sets of nozzles and for withdrawing said working fluid in said vessel into said tank.

2. A wire saw of the type in which an array of wires (W) is wound on rollers (14a–18a), said wire being arranged in parallel with one another with respect to a workpiece (10) being pressed against the array of wires (W), while applying a working fluid (32) containing loose abrasive to portions of said array of wires adjacent to an area where the workpiece is pressed against the array of wires, said wire saw comprising:
    nozzles (20, 22, and 24–29) having working fluid outflow ports arranged in correspondence with the portions of said array of wires adjacent to the area where the workpiece is pressed against said array of wires and with roller bearing devices (14b, 14c, 16b, 16c, 18b and 18c) supporting and rollers;
    a vessel (30) arranged below said rollers so as to receive a working fluid flowing out of said nozzles:
    a tank (34) for storing said working fluid; and
    working fluid circulating means (44, 46, 48, 50, 52, 54, 56–60) for supplying said working fluid in said tank to said nozzles and for withdrawing said working fluid in said vessel into said tank;
    said nozzles (20, 22, and 24–29) including:
        a first set of nozzles (20, 22) consisting of outflow ports for the working fluid (32) formed on pipes extending parallel to longitudinal axes of said rollers (14a–18a), at positions corresponding to said wires (W); and
        a second set of nozzles (24–29) consisting of working-fluid outflow ports formed separately from said first set of nozzles, at positions corresponding to said roller bearing devices (14b, 14c, 16b, 16c, 18b and 18c);
    said vessel including:
        a first receiver section (31a) for receiving the working fluid flowing out of said first set of nozzles; and
        second receiver sections (31b, 31c) for receiving the working fluid flowing out of said second set of nozzles;
    said working fluid circulating means including:
        first flow passages (46, 56) for supplying the working fluid in said tank (34) to said first set of nozzles and for withdrawing the working fluid in the first receiver section into said tank;
        second flow passages (50, 54, 58, 60) for supplying the working fluid in said tank (34) to said second set of nozzles and for withdrawing the working fluid in the second receiver sections into said tank;

a first detector (62) for detecting a first temperature (T1) of the working fluid flowing from said first receiver portion into said tank;

a second detector (47) for detecting a first flow rate (F1) of the working fluid supplied to said first set of nozzles;

at least one third detector (64, 65) for detecting a second temperature (T2) of the working fluid flowing from said second receiver sections into said tank;

at least one fourth detector (51, 55) for detecting a second flow rate (F2) of the working fluid supplied to said second set of nozzles;

means (68) for setting first and second preset temperatures;

means (44, 66, 67) for controlling the first flow rate (F1) in such a way that the first temperature (T1) becomes the first preset temperature; and means (48, 52, 66, 67) for controlling the second flow rate (F2) in such a way that the second temperature (T2) becomes the second preset temperature.

3. A wire saw according to claim 2, further comprising:

a fifth (42) for detecting a temperature (T) of the working fluid in said tank (34);

means (66) for calculating heat absorption $Q=(T1-T)F1+(T2-T)F2$;

a heat exchanger (36a, 36b, 38) for cooling the working fluid in said tank; and means (66, 67) for controlling the heat absorption by said heat exchanger in accordance with the heat absorption Q, in such a way that the temperature (T) of the working fluid in said tank becomes a preset temperature.

* * * * *